Patented Sept. 17, 1935

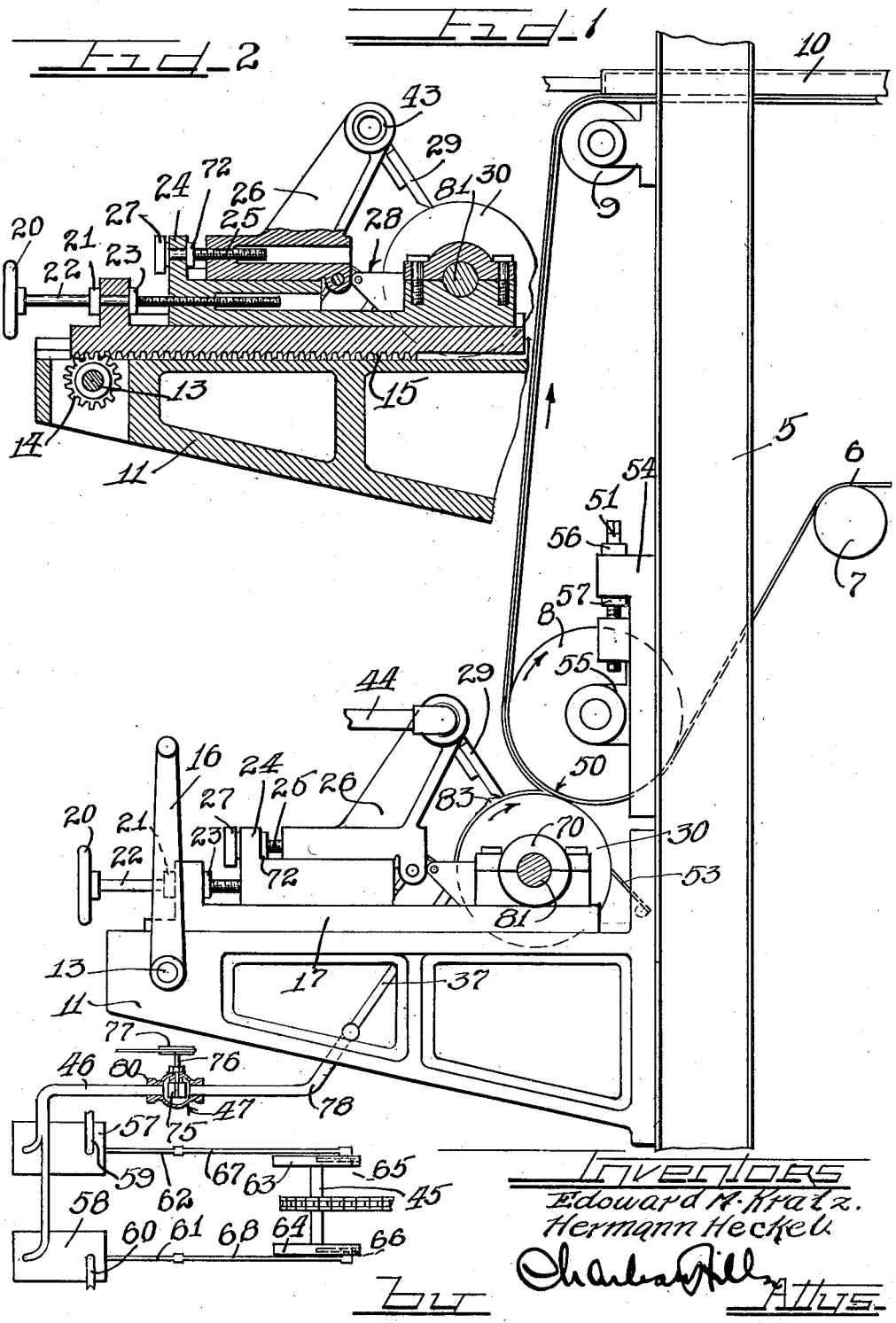

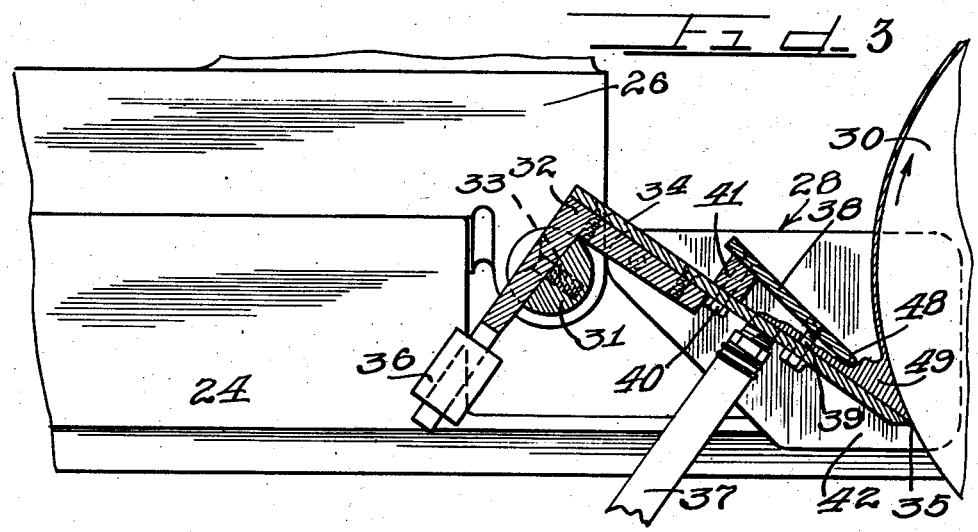
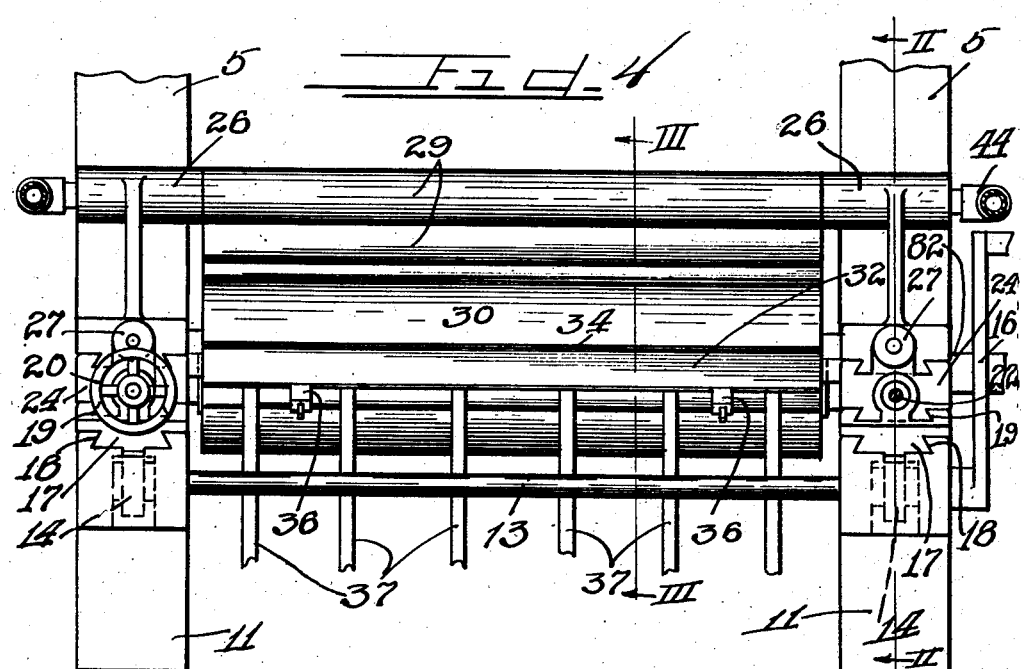

2,014,937

UNITED STATES PATENT OFFICE 2,014,937

METHOD AND APPARATUS FOR MAKING TRANSPARENT SHEET MATERIAL

Edouard M. Kratz and Hermann Heckel, Gary, Ind., assignors, by mesne assignments, to Marbo Products Corporation, Chicago, Ill., a corporation of Delaware Application August 25, 1932, Serial No. 630,406

16 Claims. (Cl. 18—15)

This invention relates to a process and apparatus for making a transparent sheet material.

It has previously been suggested that it should be possible to make thin transparent sheet material using casein as the principal ingredient but insofar as we are aware, no practical method or apparatus for accomplishing this objective has ever been developed. Casein may be hardened by the use of formaldehyde or similar materials, but it has not been commercially feasible, previous to our present invention, to the best of our knowledge, to form this casein-formaldehyde composition into thin, flexible sheet material, since the hardening action takes place too quickly to permit the operations required in the continuous manufacture of sheet material by previously known processes.

We have succeeded in perfecting a method and apparatus for producing a thin, transparent, continuous sheet or web of a casein-formaldehyde composition in which the sheet material is formed rapidly and in a continuous strip so that large rolls of a thin, transparent, uniform product may be obtained. Our product is a very satisfactory material for use in packaging various commodities, being an equivalent to the cellulose ester or regenerated cellulose sheets so universally used for this purpose. When in the form of rolls, it is well adapted for use on the ordinary automatic packaging machines which are used for packing various commodities.

It is, therefore, an object of our invention to provide a method by which a quick setting composition comprising casein and formaldehyde may be formed into thin, flexible sheets.

It is a further object of our invention to provide an apparatus for the manufacture of such sheet material in which the steps of mixing the casein and formaldehyde and forming the mixture into sheets are performed within such a short space of time that the setting of the composition takes place after the sheet has been formed.

Other and further objects of our invention will be apparent from the following specification and the accompanying drawings.

On the drawings:

Figure 1 is a composite view showing a side elevation of a portion of a transparent paper machine embodying my invention, and a diagrammatic view of a proportioning pump used in connection therewith.

Figure 2 is a fragmentary sectional view taken along the line II—II of Figure 4.

Figure 3 is a fragmentary enlarged sectional view taken along the line III—III of Figure 4 showing the mechanism for spreading our casein-formaldehyde solution.

Figure 4 is an end elevational view of the portion of our machine shown in Figure 1.

As shown on the drawings:

The reference numeral 5 denotes a pair of upright channel beams forming a supporting frame of an end portion of a transparent paper machine embodying our invention. A casting belt 6 travels around an idler roll 7 and under a large rubber covered roller 8, at which point a coating of casein is applied to the outer surface of said belt in a manner to be described hereinafter. From this point said belt 6 travels upwardly, passing around a roller 9 and into a compartment 10 which is heated by any suitable means to set the sheet material by completing the chemical reaction between the ingredients of the coating composition. From this point, the casting belt, which now carries a smooth non-flowing and transparent coating of the casein composition, passes to a festoon drying chamber (not shown) in which the sheet is completely dried. After the drying step is completed, the casein film is stripped off of the casting belt, after which the said belt is returned to the idler roller 7 shown in Figure 1, and the cycle is repeated. The power for driving casting belt 6 is applied to said belt by means of a suction roll (not shown). This method of driving casting belts is disclosed in Reissue Patent No. 17,854.

Since duplicate parts occur at each side of our device, like reference numerals will be used to refer to each of the duplicated parts. Our coating assembly is supported on the frame 5 by brackets 11. The faces of said brackets are provided with dovetail grooves or gibways 18 which slidably engage dovetail members 17, provision being made for movement of the dovetail members 17, with respect to the brackets 11. Racks 15 are provided along the under sides of the members 17 which engage pinions 14 mounted at each end of a shaft 13. A crank 16 is provided for rotation of the shaft 13. This arrangement is particularly convenient for emergency use, such as, for example, when some portion of the machine has broken down and it is desired to instantly stop the coating operation.

Along the upper side of the rack members 17, a second set of dovetail grooves or gibways 19 are provided, which engage dovetail members 24, provision being made for relative movement. Screws 22 threadedly engage the dovetail members 24 and extend through the upper portions of rack members 17. Lengthwise movement of screws 22 in rack members 17 is prevented by collars 21 and 23. Hand wheels 20 are provided for convenience in turning screws 22. Hand wheel 20 has been shown on the left hand side only of Figure 4, a detail of the parts directly behind said hand wheels being shown on the right hand side. The fine adjustment thus provided is used to adjust the distance between the roller 8 and a chromium plated roller 30, which is supported on the dovetail members 24 by bearings 70.

Roller 30 is mounted on a shaft 81 which extends beyond the bearing 70 at 82. Power to drive roller 30 is applied to said extension of shaft 81 in any desired manner.

The speed of the roller 30 with respect to the casting belt 6 is very critical. The roller 30 should move at slightly greater speed than the casting belt for best results. The speed of roller 30 and the adjustment of the doctor blade 29 must be such that a small fillet of our composition will accumulate at 83. This fillet is essential in preventing the formation of bubbles and thin spots in the layer of composition applied to the casting belt.

Dovetail members 24 are provided with dovetail or gibway grooves along their upper surfaces which engage dovetail projections on the bottom of dovetail members 26, provision being made for relative movement. Screws 25 threadedly engage the dovetail members 26 and pass through the upper portions of the dovetail members 24, lengthwise movement being prevented by collars 27 and 72.

A fountain 28, which is shown in detail in Figure 3, is of a special construction which is adapted for use with a casein-formaldehyde solution which sets after being mixed for but a few seconds. The fountain 28 is supported upon a shaft 31, which is suitably journaled at its ends in the members 26. An angle plate 32 is rigidly attached to said shaft 31 by means of screws, one of which is shown at 33. A metal plate 34, which forms the bottom member of the fountain 28, is supported by the angle plate 32. The lower edge of said plate 34 contacts with the roll 30 along a line of contact indicated at 35. A series of counter weights 36 adjustably attached to arms extending from the angle plate 32 assist in maintaining contact at the point 35.

A series of flexible tubes 37 extend through holes in the plate 34, and supply casein-formaldehyde solution to the upper surface of said plate. A plate 38 is adjustably positioned in spaced relation to the openings of said tubes 37 by means of screws 39 and 40. A suitable dam of rubber or other packing material 41 is placed along the upper edge of the plate 38 whereby the liquid delivered by tubes 37 is prevented from flowing upwardly along the upper surface of plate 34. Plates 42 are placed at the ends of the fountain 28 to prevent the escape of the casein-formaldehyde solution.

The doctor blade 29 is rigidly attached to the members 26 by means of a tube 43. This tube is connected to any suitable source of hot water, the temperature of which is thermostatically controlled, by means of a pipe 44. The purpose of flowing hot water through the tube 43 is to maintain the doctor blade 29 at a constant temperature. In operation, the heat of the coating solution would otherwise cause variations in the settings of the doctor blade 29, thereby producing a coating of varying thickness. This is avoided by maintaining the blade 29 at a constant temperature by any suitable means.

The casein solution is supplied by a proportioning pump, indicated diagrammatically in Figure 1 which comprises cylinders 57 and 58, one of which is for the formaldehyde solution and the other the casein. The intake ports 59 and 60 are connected to suitable reservoirs containing the respective solutions. The piston rods 61 and 62 are connected to a shaft 45 by means of connecting rods 67 and 68 and the adjustable cranks 63 and 64 which are provided with radial slots as at 65 and 66. The stroke of each cylinder may be independently adjusted by varying the position of the attachment of rods 67 and 68 in the slots of their respective cranks. A pipe 46 is connected to cylinders 57 and 58 and to a mixing device which consists of an outer case 80, containing a paddle wheel 75 attached to a shaft 76 which is rotated by any suitable source of power attached to a wheel 77. This mixing device is connected to the flexible tubes 37 through a pipe 78. Thus it will be seen that the pump may be adjusted to deliver a continuous stream of casein and formaldehyde solutions mixed in any suitable proportions.

In operation, the separate solutions of formaldehyde and casein are pumped by the proportioning pump into the pipe 46. From pipe 46 the mixed solution enters the mixing device 47. From the mixing device 47, the mixture of casein and formaldehyde is conducted to the series of flexible tubes 37 which distribute it evenly along the entire length of the fountain 28. The mixture enters the fountain between the plates 34 and 38. The mixture forms a small pond between said plates, finally running through the open space or orifice at 48 which is at the bottom of the pond. A supply accumulates at the point 49 where it contacts with the roller 30.

At this point, a thin film of the coating material is formed upon the surface of the roll 30. This film is carried upwardly by the rotation of the roll until it contacts with the doctor blade 29 which scrapes off any excess material to give a uniform thickness to the coating layer. This uniform layer is now carried around to the point 50 at which the surface of the roll 30 lightly contacts with the outside surface of the casting belt 6. At this point, the casting belt is traveling in the opposite direction from that of the surface of the roll 30 so that the coating layer is transferred from the surface of the roll 30 to the surface of the casting belt. Extremely fine adjustment of the apparatus is required since it is essential that there be no appreciable scraping of the casting belt by the roll 30 but yet they must contact sufficiently to permit substantially all of the coating solution on the surface of the roller 30 to be transferred to the casting belt.

L-shaped blocks of iron 54 are attached to the frame 5 and bearings 55 supporting the roller 8 slidably engage therewith. Screws 51 threadedly engage the bearings 55 and pass through holes in the L-shaped blocks 54, vertical movement in said blocks being prevented by collars 56 and 57.

This vertical adjustment of the cylinder 8 supplements the lateral adjustment of the cylinder 30 and the doctor blade 29, described above. For best results, the cylinder 8 should be covered with a layer of rubber or other similar material. A scraper 53 constantly cleans the surface of the cylinder 30, preventing an accumulation of dirt at the line of contact 35.

Thus it will be seen that we have provided a machine in which a quick setting solution may be mixed and formed into sheets at a sufficient speed so that the setting occurs entirely after the material is formed into a sheet of the desired thickness. A special feature of our machine is that there are no reservoirs or other containers to hold our solution after mixing, and our machine is designed at all points in such manner that the mixed solution is advanced at a uniform rate, reaching the point where it is formed into a sheet a definite number of seconds after it is mixed. At no point in the fountain are there corners or sharp angles so placed that part of the solution may take a round about route reaching the surface of the roller 30 after a longer period of time than the other portions of the same solution.

Another distinct advantage of our machine is that it is adapted to handle solutions of a high viscosity. In this respect it differs from previous devices which depended upon the viscosity of the solution to determine the thickness of the sheet and required that the solution be very dilute when thin sheets were to be produced. In our apparatus, the solution may be very viscous and the thickness of the film will be determined by the space between the doctor blade 29 and the roll 30, independent of the viscosity of the solution being used.

The mixture of casein and formaldehyde used in this apparatus is not a part of the invention claimed herein but will be made the subject matter of a separate application. The formaldehyde solution comprises a 10% solution of formaldehyde in water while the casein solution comprises a purified casein which has been dissolved in an aqueous alkali and the pH of the solution subsequently adjusted. The casein solution should comprise about 13-14% casein and 3.4% glycerine or other softening agent, the balance being water. When our casein and formaldehyde solutions are prepared in the manner disclosed above, the proportioning pump should be adjusted to mix about 1 part of formaldehyde solution with 22 parts of the casein solution.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. In an apparatus for producing sheet material, means for mixing constituent ingredients to be formed into sheet material in predetermined proportions, a feed roller, means for distributing the mixed ingredients uniformly the length of said roller to form a coating thereon, scraping means for regulating the thickness of said coating and means for maintaining said scraping means at a constant temperature.

2. In an apparatus for producing sheet material, a rotatable feed roller, means for applying a coating of a viscous sheet forming material thereto, doctor means adjustably positioned with respect to said roller to gauge the thickness of said coating, and means for maintaining said doctor means at a constant temperature.

3. In a device of the class described a pair of racks having pinions cooperating therewith, a feed roller, bars carrying bearings supporting said roller and slideably attached to the upper faces of said racks, means for maintaining said bars in any desired position along the face of said racks, a fountain and a doctor blade adapted to cooperate with said roller, supporting members slideably mounted on the upper face of said bars, said supporting members maintaining said doctor blade and fountain in an operative position relative to said roller and means for maintaining said supporting members in any desired position along the upper faces of said bars.

4. In a device of the class described, a cylinder and a doctor blade cooperating therewith, said cylinder being rotatably mounted on horizontal rack members, pinions cooperating with said racks and mounted on a single shaft whereby the position of said cylinder may be adjusted laterally, dovetail grooves provided in said rack members, dovetail members carrying said doctor blade interlocking with said grooves and slideable therein whereby the position of said doctor blade with respect to said cylinder may be adjusted.

5. In a film forming apparatus, a fountain roll, a slidable carriage for said fountain roll, a doctor, a carriage for said doctor slidable on the fountain roll carriage, and means for adjusting said doctor relative to said fountain roll.

6. In a film forming apparatus, a carrier belt, a fountain roll, a carriage for said fountain roll, means for sliding said carriage to adjust said fountain roll relative to said carrier belt, a doctor, a carriage for said doctor and means for sliding the doctor's carriage to adjust the doctor relative to said fountain roll.

7. In a film forming apparatus, a resilient roll, a carrier belt trained around said resilient roll, a fountain roll below said resilient roll, a carriage for said fountain roll, means for sliding said carriage to adjust said fountain roll relative to said resilient roll and carrier belt, a doctor, a carriage for said doctor slidable on the fountain roll carriage and means for sliding the doctor carriage relative to the fountain roll carriage.

8. A film forming apparatus comprising, in combination a trough, a fountain roll rotatable through said trough, a doctor above said trough in adjustable spaced relation from the periphery of the fountain roll, a resilient roller above said fountain roll, a casting belt trained around said resilient roller in contact with said fountain roll, means for rotating said fountain roll and means for rotating said resilient roller to advance the casting belt in a direction opposite to the direction in which the surface of the fountain roll is rotated.

9. A film forming mechanism comprising, in combination, a trough for containing a film forming solution, a fountain roll rotatable through said trough for picking up a film of said solution on its periphery, a doctor in adjustable spaced relation from the periphery of said roll to gauge the thickness of the film thereon, a casting belt adapted to pick up the gauged film on said fountain roll and means for advancing said belt in a surface direction opposite to the direction in which the periphery of the fountain roll is rotating so that the film thereon is wiped off by the belt.

10. The process of making transparent sheet material which comprises picking up a film of sheet forming solution on a smooth rotating surface, doctoring said film to a uniform gauge, contacting the doctored film with a carrier belt advancing in a direction opposite to the direction in which the film is traveling to wipe the film from the rotating surface onto the belt, allowing the film to dry on the belt, and stripping the resulting sheet from the belt.

11. A method of making sheet material from a quick setting film forming solution which comprises continually mixing flowing streams of the solution ingredients in predetermined proportions, immediately flowing the mixed solution against a revolving surface to deposit a film on said surface, uniformly gauging the thickness of said film, transferring said film to a carrier belt, allowing the film to set on said belt and stripping the resulting sheet material from said belt.

12. A method of making a transparent casein sheet material which comprises continually mixing a flowing stream of an aqueous casein solution containing a softening agent with an aqueous solution of formaldehyde in the proper proportion to form a quick setting solution, immediately flowing the mixed solution against a revolving surface to deposit a film on said surface, uniformly gauging the thickness of said film, wiping off said film onto a carrier belt, allowing the film to set on the carrier belt and stripping the resulting casein sheet from said belt.

13. In a film forming apparatus having a fountain roll, a fountain comprising a shaft, an angle member secured to said shaft, a plate on one leg of said angle member extending toward said fountain roll, a weight on the other leg of said angle member, means to slide said weight on said leg to rotate the shaft and move the plate into the desired contact with said fountain roller.

14. In a film-forming apparatus, a fountain roll, a pivotally mounted plate extending across the width of said roll and adapted to have an edge thereof scrape thereagainst, a second plate carried by the first plate and placed thereabove in inclined relation to define an orifice disposed toward the fountain roll, and means to feed a film-forming solution between the plates for discharge through the orifice onto the fountain roll.

15. In a film-forming apparatus, a fountain roll, an apron extending across the width of said roll having an edge urged against the periphery thereof, a plate carried by said apron in spaced relation thereabove to define an orifice disposed toward the fountain roll, said orifice being spaced from the fountain roll, a dam between the back edge of the plate and the apron to seal the space therebetween, a plurality of conduits to supply a film-forming solution between the apron and plate uniformly across the width thereof for discharge through the orifice, whereby said discharged solution forms a small pond at the edge of the apron for coating the fountain roll, a doctor for gauging the thickness of the coating on the fountain roll, and an endless carrier band urged against the fountain roll for receiving the doctored coating therefrom.

16. Apparatus for making films from a quick-setting, film-forming solution, which comprises a conduit for the non-setting ingredients of the solution, a second conduit for the setting agent of the solution, means to regulate the amount of flow through said conduits, a feed pipe for receiving the materials from said conduits, a mixing device in said feed pipe to admix thoroughly the setting agent with the other ingredients, a fountain roll, and means for immediately coating the solution from the feed pipe onto the fountain roll.

EDOUARD M. KRATZ.
HERMANN HECKEL.